(12) United States Patent
Hobbs et al.

(10) Patent No.: US 9,555,730 B1
(45) Date of Patent: Jan. 31, 2017

(54) DISCHARGE APPARATUS FOR SELF-UNLOADING BULK MATERIAL BED

(71) Applicant: Trinity Trailer Mfg., Inc., Boise, ID (US)

(72) Inventors: Matthew Lynn Hobbs, Meridian, ID (US); Wayde Johnson, Hazelton, ID (US)

(73) Assignee: Trinity Trailer Mfg, Inc., Boise, ID (US)

( * ) Notice: Subject to any disclaimer, the term of this patent is extended or adjusted under 35 U.S.C. 154(b) by 0 days.

(21) Appl. No.: 15/173,030

(22) Filed: Jun. 3, 2016

(51) Int. Cl.
*B60P 1/00* (2006.01)

(52) U.S. Cl.
CPC ........................................ *B60P 1/00* (2013.01)

(58) Field of Classification Search
CPC ........................................................ B60P 1/00
USPC ..................... 298/7, 17 R, 22 R, 17 T, 23 R; 222/460–462, 527; 296/58–61; 414/519; 193/4–6, 17
See application file for complete search history.

(56) References Cited

U.S. PATENT DOCUMENTS

| | | | | |
|---|---|---|---|---|
| 3,361,476 A | * | 1/1968 | Smock | B60P 1/003 298/7 |
| 8,783,783 B1 | * | 7/2014 | Mintonye, II | B60P 1/283 298/7 |

* cited by examiner

*Primary Examiner* — Stephen Gordon
(74) *Attorney, Agent, or Firm* — Hawley Troxell Ennis & Hawley LLP; Allison C. Parker; Philip McKay

(57) ABSTRACT

A self-unloading bulk material bed with a discharge opening is provided. An apparatus for discharging materials from the self-unloading bulk material bed includes a first and second tapered fin on either surface of the discharge opening. The tapered fins direct materials moving through the discharge opening down so that they do not build up around the discharge opening.

30 Claims, 10 Drawing Sheets

DISCHARGE APPARATUS FOR SELF-UNLOADING BULK MATERIAL BED

BACKGROUND

Self-unloading truck beds and trailers are invaluable in many industries for hauling and storing bulk materials including commodities and refuse. For example, in the agricultural industry, self-unloading bulk material beds often take the form of trailers or trucks and are used to transport commodities from the field to storage and processing facilities.

Generally, self-unloading bulk material beds include a conveyor system, such as a conveyor belt or chain and belt assembly, which moves material from inside the self-unloading bulk material bed to a discharge opening. This conveyor system discharges materials when the materials reach a shaft around which the conveyor rotates. When the conveyor rotates around the shaft, the materials transported on the conveyor naturally fall to a receiving target. Thus, during the unloading process, the discharge opening of the self-unloading bulk material bed and the receiving target must be aligned.

If, for instance, the self-unloading bulk material bed is part of a trailer, the trailer often must be backed up to the receiving target location. For example, if the commodities are held in the trailer and are to be transported into a building for processing, the trailer may be backed up to the building's conveyor system, which moves materials from outside the building to inside the building. A discharge opening associated with the self-unloading bulk material bed component of the trailer will be positioned over the building's conveyor system. When the self-unloading bulk material bed's conveyor system begins moving, the commodities in the trailer will be discharged onto the building's conveyor system through a discharge opening. While passing through this discharge opening, the commodities are guided by a pair of tail fins associated with the self-unloading bulk material bed. Generally, one tail fin is located on each lateral surface of the discharge opening.

Although self-unloading bulk material beds are incredibly useful for unloading materials in situations such as the one described above, the current mechanism for discharging materials from a self-unloading bulk material bed onto receiving equipment is insufficient.

Often, the discharge opening of the self-unloading bulk material bed creates a bottleneck. The self-unloading bulk material bed's conveyor moves too quickly for the size of the discharge opening and the materials begin to "creep" up the tail fins. Ultimately, this build-up causes commodities to fall from the self-unloading bulk material bed, miss the receiving target, and hit the ground. Many commodities that fall to the ground must be discarded as waste materials. As a result, valuable materials are damaged and wasted and resources must be expended to clean up the mess. Furthermore, a buildup of materials can place strain on the self-unloading bulk material bed and related equipment, resulting in equipment damage.

The shaft mount used to hold the shaft around which the conveyor rotates creates additional problems. Currently, during the unloading process, the shaft mount sidewalls damage commodities that are discharged from the self-unloading bulk material bed because commodities that pass by the shaft mount sidewalls are often bruised or crushed.

In addition to the concerns associated with discharging materials from the hauler, there are significant issues associated with loading materials into a self-unloading bulk material bed. When loading commodities such as potatoes into a self-unloading bulk material bed, a piler is often used. This piler uses a boom to transport commodities over the sides of the self-unloading bulk material bed, but the piler is often not long enough to reach its boom to the inside front wall of a long self-unloading bulk material bed. This problem is exacerbated because it is frequently impossible to line-up the piler and the self-unloading bulk material bed in a straight, square manner.

What is needed is a method and apparatus that allows a user to efficiently load and unload a self-unloading bulk material bed without damaging the self-unloading bulk material bed, the piler, or the materials to be loaded and unloaded.

SUMMARY

After considering the issues outlined above, the Inventors realized that the problems were happening for several specific reasons.

First, as to the material build up around the discharge opening, the Inventors recognized that when materials are discharged, tail fins provided by the prior art do not guide the commodities in a downward direction because the tail fins have lateral surfaces that run parallel to one another. This prior art parallel configuration allows commodities to creep up the tail fins and then fall to the floor. This fall bruises the commodities and creates a mess that must be cleaned up. After experimentation, the Inventors realized that if the tail fins are tapered so that their surfaces are no longer parallel, the improved tapered shape of the tail fins will help direct commodities down towards the receiving target. With a tapered tail fin, commodities no longer creep up the fin until gravity takes over, forcing the valuable materials to fall. Furthermore, the Inventors added a deflector to the free surface of each tail fin, which provides a barrier to any commodities at risk of falling over the tail fin's edge.

Second, the Inventors recognized that the shaft mounts could be used to additionally guide commodities being discharged from the self-unloading bulk material bed. The Inventors recessed the shaft by moving it towards the body of the self-unloading bulk material bed, which allows the exposed shaft mount sidewalls to act as guides for discharged commodities falling from the conveyor.

Third, the Inventors also recognized that many discharged commodities are damaged due to the shaft mount sidewalls holding the shaft around which the conveyor rotates. After considering the issue, the Inventors realized that if they placed a chamfer on each shaft mount sidewall edge exposed to the self-unloading bulk material bed conveyer, the shaft mount sidewalls would no longer bruise or crush the discharged commodities.

Finally, the Inventors recognized that by creating tapered tail fins and recessing the shaft, the problem of the piler being unable to place its boom to the inside front wall of a long self-unloading bulk material bed would also be solved. The tapered tail fins and the recessed shaft, as disclosed herein, allow the piler to approach the self-unloading bulk material bed more closely, which, in turn, allows the piler's boom to reach the inside front wall of the self-unloading bulk material bed.

The problems of aligning a self-unloading bulk material bed with a piler and the problem of overflowing and damaged commodities are mitigated by an apparatus with a recessed shaft, shaft mount sidewalls with chamfers, tapered tail fins, and deflectors.

As will be discussed below, an apparatus for discharging materials from a self-unloading bulk material bed provides a simple and effective method and system for unloading commodities from the self-unloading bulk material bed. In one embodiment, the self-unloading bulk material bed includes a discharge opening, wherein materials are unloaded from the self-unloading bulk material bed through the discharge opening. In one embodiment, the discharge opening includes a first discharge lateral surface, a second discharge lateral surface, a discharge bottom surface, and a discharge top surface.

In one embodiment, the apparatus for discharging materials from the self-unloading bulk material bed includes a first fin and a second fin. In one embodiment, the first fin and the second fin are located on opposite surfaces of the discharge opening. In one embodiment, the first fin is located on the first discharge lateral surface. In one embodiment, the second fin is located on the second discharge lateral surface.

In one embodiment, a fin includes an elongated fin body having at least six surfaces including a primary body surface, a secondary body surface, a free surface, a bottom surface, a top surface, and a bed surface. In one embodiment, the bottom surface is positioned below the top surface. In one embodiment, the bed surface is adjacent to the first or second lateral surface of the discharge opening. In one embodiment, a fin includes an elongated fin body having at least five surfaces including a primary body surface, a secondary body surface, a free surface, a bottom surface, and a bed surface.

In one embodiment, the interior angle between the bed surface and the bottom surface is approximately 90 degrees. In one embodiment, the interior angle between the bed surface and the top surface is acute. In one embodiment, the angle between the top surface and the free surface is obtuse. In one embodiment, the interior angle between the free surface and the bottom surface is acute. In one embodiment, the top surface is shorter than the bottom surface. In one embodiment, the top surface is longer than the bottom surface.

In one embodiment, the fin is an irregular quadrilateral. In one embodiment, the fin is a trapezoid. In one embodiment, the fin is a rhombus. In one embodiment, the first fin includes an elongated first fin body having a first fin free surface, a first fin bottom surface, a first fin top surface, and a first fin bed surface. In one embodiment, the second fin includes an elongated second fin body having a second fin free surface, a second fin bottom surface, a second fin top surface, and a second fin bed surface.

The fins disclosed herein provide the benefit of absorbing an overflow of materials from a self-unloading bulk material bed while also directing those materials back towards a receiving target.

In one embodiment, a first deflector is adjacent the first fin free surface of the first fin body. In one embodiment, a second deflector is adjacent to the second fin free surface of the second fin body. In one embodiment, the first deflector is removably attached to the first fin free surface of the first fin body. In one embodiment, the second deflector is removably attached to the second fin free surface of the second fin body. The deflectors disclosed herein prevent materials from falling from the free surface of a fin during discharge.

In one embodiment, the apparatus for discharging materials from the self-unloading bulk material bed includes a shaft around which a conveyor in the bottom of the self-unloading bulk material bed rotates and a shaft mount system. In one embodiment, the shaft is recessed. In one embodiment, the shaft is recessed at least six inches from the free surface of a shaft mount sidewall, towards the surface of the shaft mount sidewall closest to the self-unloading bulk material bed.

By recessing the shaft, shaft mount sidewalls are available to direct commodities toward the conveyor and the commodities will begin to fall off the self-unloading bulk material bed sooner than they would if the shaft were flush with the sidewalls' free surfaces. Because the sidewalls guide the discharged materials, the materials are neatly placed onto a receiving conveyor or dropped into a receiving container.

In one embodiment, the shaft mount includes a first sidewall and a second sidewall. In one embodiment, the first sidewall includes a first sidewall bed surface, a first sidewall top surface, a first sidewall free surface, and a first sidewall bottom surface. In one embodiment, the shaft is mounted at least six inches from the first sidewall free surface, towards the first sidewall bed surface.

In one embodiment, the second sidewall includes a second sidewall bed surface, a second sidewall top surface, a second sidewall free surface, and a second sidewall bottom surface. In one embodiment, the shaft is mounted at least six inches from the second sidewall free surface, towards the second sidewall bed surface.

In one embodiment, the first sidewall includes a first chamfer at a corner where the first sidewall free surface joins with the first sidewall bottom surface.

In one embodiment, the second sidewall includes a second chamfer at a corner where the second sidewall free surface joins with the second sidewall bottom surface.

The first and second chamfers allow extra clearance for commodities in the discharge process. Currently, commodities often make contact with, or are trapped by, the shaft mount sidewalls and the receiving target conveyor. The first and second chamfers remove the portion of the shaft mount sidewalls on which the commodities become trapped and ruined.

The embodiments disclosed herein provide an apparatus that allows a user to efficiently load and unload a self-unloading bulk material bed without damaging the self-unloading bulk material bed, receiving equipment, loading equipment, or the materials to be loaded or unloaded.

Figure 1A:
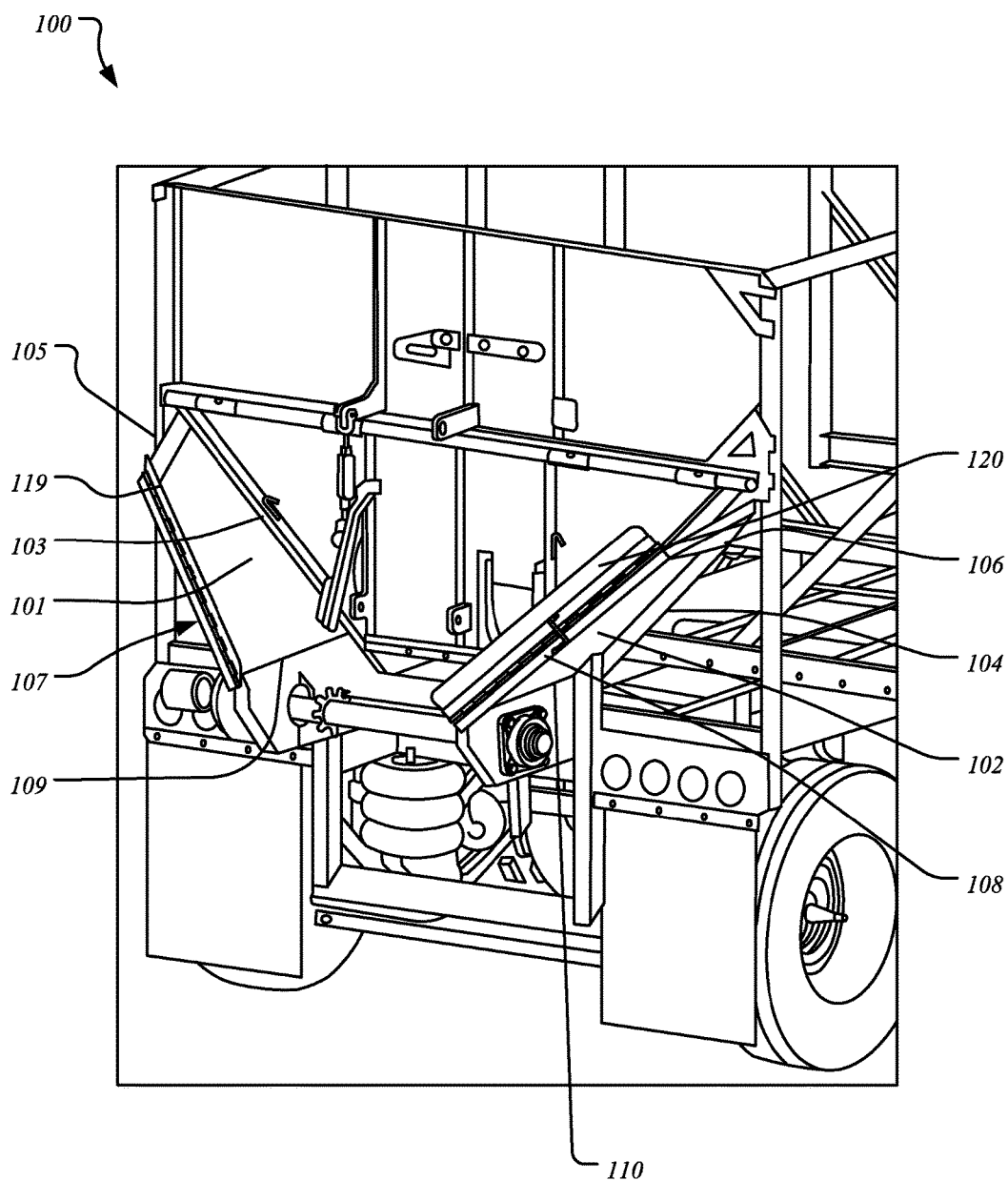
FIG. 1A is a perspective view of an apparatus for discharging materials from a self-unloading bulk material bed, in accordance with one embodiment.

Common reference numerals are used throughout the figures and the detailed description to indicate like elements. One skilled in the art will readily recognize that the above figures are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

As used herein, the term "self-unloading bulk material bed" includes, but is not limited to, self unloading containers, trailers, truck beds, and/or any other self-unloading bulk material bed as known at the time of filing or developed thereafter. Examples of self-unloading bulk material beds may be found in Eisenman U.S. Pat. No. 4,055,265 (issued Oct. 25, 1977) and Eisenman U.S. Pat. No. 4,230,360 (issued Oct. 28, 1980).

In various embodiments, a self-unloading bulk material bed includes a bed front wall, an upright rear wall, left and right sidewalls, and a bottom floor. In one embodiment, the bottom floor is formed at least partially by a bed conveyor system. In one embodiment, the lower portions of the left and right sidewalls slant towards the middle of the bottom floor, so that bulk material is directed towards the conveyor. As the bed conveyor carries materials through a discharge opening in the rear wall, bulk materials in the bed continually falls down onto the conveyor until the bed is empty. One example of a conveyor system is described in Eisenman U.S. Pat. No. 7,597,191 (issued Oct. 6, 2009).

The discharge opening includes a first discharge lateral surface, a second discharge lateral surface, a discharge bottom surface, and a discharge top surface, according to various embodiments.

As will be shown, the discharge apparatus disclosed herein provides multiple benefits. First, the discharge apparatus allows a piler to approach a self-unloading bulk material bed more closely than currently possible, because, in one embodiment, the free surfaces of the fins are tapered towards the self-unloading bulk material bed rather than perpendicular to the ground. This shape allows the piler to get close to the self-unloading bulk material bed without actually making contact, which mitigates the potential for damage to the piler and to the self-unloading bulk material bed.

Second, the discharge apparatus effectively directs materials toward a receiving target during the unloading process. In various embodiments, a receiving target may include a receiving conveyor or a receiving container. Through the shape of the fins, through deflectors coupled to the fins, and/or by locating the shaft towards the bed surface of the shaft mount sidewalls, the discharge apparatus effectively directs materials towards a receiving target.

In one embodiment, the fins are tapered due to the free surfaces of the fins being angled towards the self-unloading bulk material bed. This shape allows the fins to gather materials building up at the discharge opening while also encouraging materials to fall towards the receiving target, such as the receiving conveyor or the receiving container. Furthermore, in one embodiment, deflectors are coupled to the free surfaces of the fins. These deflectors create a barrier to prevent materials from falling off the free surfaces of the fins and instead direct materials towards the receiving target.

Additionally, in one embodiment, a conveyor moves along the bottom of the self-unloading bulk material bed and rotates around a shaft coupled to a shaft mount system. In one embodiment, the shaft is recessed so space exists between the free surfaces of the shaft mount sidewalls and the shaft. Thus, when materials begin to fall from the conveyor as it rotates around the shaft, the space between the free surfaces of the shaft mount sidewalls and the shaft allows the sidewalls to direct the materials downwards toward the receiving target. As a result of this guidance, the materials unload more quickly and in a manner that minimizes damage to the materials and to equipment.

As an additional benefit, the discharge apparatus limits damage to materials by preventing them from being harmed by the sidewalls of the shaft mount during the unloading process. In one embodiment, the corners at the intersection of the free surfaces and the bottom surfaces of the shaft mount sidewalls include chamfers, which provide extra clearance for materials being unloaded onto a receiving target. In the existing art, materials often make contact with or are trapped between the shaft mounts and the receiving target, resulting in damaged and potentially ruined materials.

As used herein, the terms "materials," "commodity," "commodities," and "materials commodities" include, but are not limited to, potatoes, grains, grain by-products, hay, hay cubes, hay pellets, gravel, limestone, sugar beets, haylage, mulch, compost, garbage, fertilizer, fly-ash, waste, garbage, and/or trash.

Turning now to the drawings, FIG. 1A is an illustration of one embodiment of a discharge apparatus 100.

In one embodiment, discharge apparatus 100 includes a first fin body 101 and a second fin body 102. In various embodiments, the first fin body 101 includes a first fin bed surface 103, a first fin top surface 105, a first fin free surface 107, and a first fin bottom surface 109.

In one embodiment, first fin body 101 is coupled adjacent to the first discharge lateral surface (not labeled) of the discharge opening (not labeled). In one embodiment, first fin body 101 is removably coupled adjacent to the first discharge lateral surface (not labeled) of the discharge opening (not labeled) of the self-unloading bulk material bed. In one embodiment, first fin body 101 is coupled adjacent to the first discharge lateral surface (not labeled) of the discharge opening (not labeled) via a first fin coupling mechanism (not labeled). In one embodiment, the first fin coupling mechanism (not labeled) includes a weld.

In one embodiment, a first deflector 119 is coupled to the first fin free surface 107 of the first fin body 101. In one embodiment, the first deflector 119 is removably coupled to the first fin free surface 107. In one embodiment, the first deflector 119 is coupled to the first fin free surface 107 to allow the first deflector 119 to fold flush with the first fin body 101.

In various embodiments, the second fin body 102 includes a second fin bed surface 104, a second fin top surface 106, a second fin free surface 108, and a second fin bottom surface 110.

In one embodiment, second fin body 102 is coupled adjacent to the second discharge lateral surface (not labeled) of the discharge opening (not labeled). In one embodiment, second fin body 102 is removably coupled adjacent to the second discharge lateral surface (not labeled) of the discharge opening (not labeled) of the self-unloading bulk material bed (not labeled). In one embodiment, second fin body 102 is coupled adjacent to the second discharge lateral surface (not labeled) of the discharge opening (not labeled) via a second fin coupling mechanism (not pictured). In one embodiment, the second fin coupling mechanism includes a weld.

In one embodiment, a second deflector 120 is coupled to the second fin free surface 108. In one embodiment, the second deflector 120 is removably coupled to the second fin free surface 108. In one embodiment, the second deflector 120 is coupled to the second fin free surface 108 to allow the second deflector 120 to fold flush with the second fin body 102.

Figure 1B:
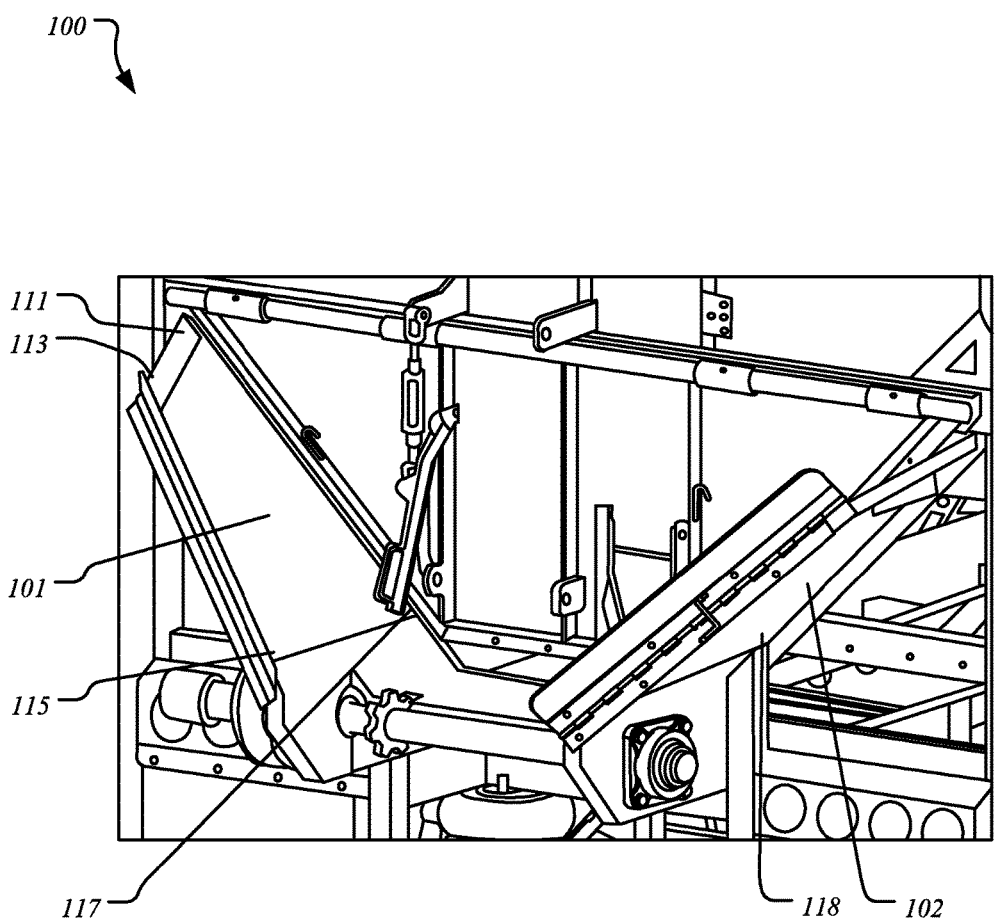
FIG. 1B is a perspective view of a first and second fin body, in accordance with one embodiment.

As seen in FIG. 1B, in one embodiment, the first fin body 101 includes a first bed-top angle 111, which occurs at the interior of the intersection of the first fin bed surface 103 (as seen in FIG. 1A) and the first fin top surface 105 (as seen in FIG. 1A). In one embodiment, the first fin body 101 includes a first top-free angle 113, which occurs at the interior of the intersection of the first fin top surface 105 (as seen in FIG. 1A) and the first fin free surface 107 (as seen in FIG. 1A). In one embodiment, the first fin body 101 includes a first free-bottom angle 115, which occurs at the interior of the intersection of the first fin free surface 107 (as seen in FIG. 1A) and the first fin bottom surface 109 (as seen in FIG. 1A). In one embodiment, the first fin body 101 includes a first bottom-bed angle 117, which occurs at the interior of the intersection of the first fin bottom surface 109 (as seen in FIG. 1A) and the first fin bed surface 103.

In one embodiment, the first free-bottom angle 115 is less than 90 degrees. Because the angle is acute, it causes the first fin free surface 107 (as seen in FIG. 1A) to slope towards the self-unloading bulk material bed (not labeled). Because the first fin free surface 107 (as seen in FIG. 1A) slopes towards the self-unloading bulk material bed (not labeled), the first fin body 101 is tapered, which allows a piler (not pictured) to closely approach a self-unloading bulk material bed (not labeled) and directs materials towards a receiving target (not pictured) during the unloading process.

In one embodiment, the first bed-top angle 111 is approximately 90 degrees. In one embodiment, the first bed-top angle 111 is greater than 90 degrees. In one embodiment, the first bed-top angle 111 is less than 90 degrees.

In one embodiment, the first top-free angle 113 is approximately 90 degrees. In one embodiment, the first top-free angle 113 is greater than 90 degrees. In one embodiment, the first top-free angle 113 is less than 90 degrees.

In one embodiment, the first free-bottom angle 115 is approximately 90 degrees. In one embodiment, the first free-bottom angle 115 is greater than 90 degrees. In one embodiment, the first free-bottom angle 115 is less than 90 degrees.

In one embodiment, the first bottom-bed angle 117 is approximately 90 degrees. In one embodiment, the first bottom-bed angle 117 is greater than 90 degrees. In one embodiment, the first bottom-bed angle 117 is less than 90 degrees.

Figure 2:
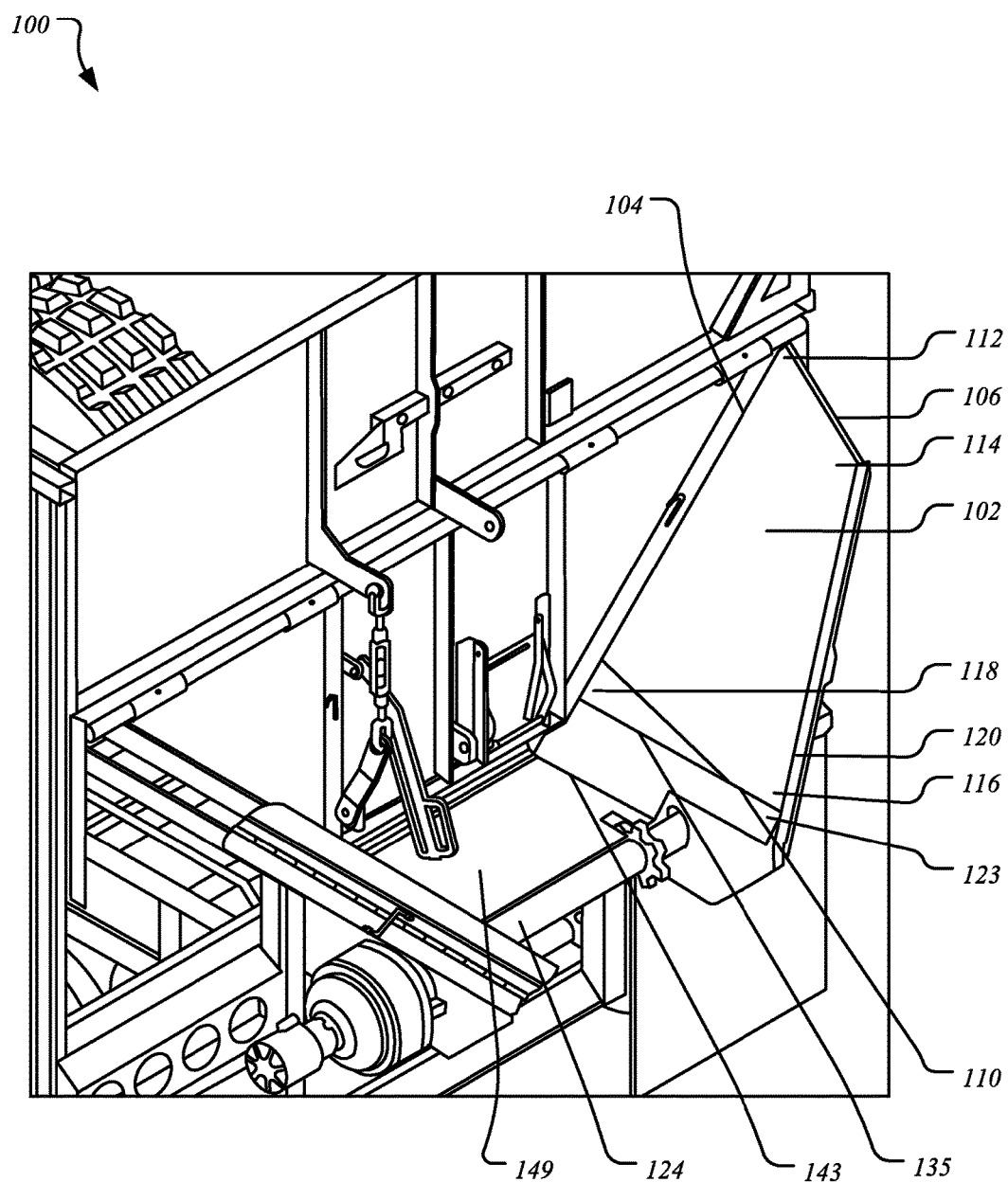
FIG. 2 is an overhead angle view of a second fin body including internal angles and surfaces of a second fin body, in accordance with one embodiment.

In one embodiment, the second fin body 102 includes a second bed-top angle 112 (shown in FIG. 2), which occurs at the interior of the intersection of the second fin bed surface 104 (shown in FIG. 2) and the second fin top surface 106 (shown in FIG. 2). In one embodiment, the second fin body 102 includes a second top-free angle 114 (shown in FIG. 2), which occurs at the interior of the intersection of the second fin top surface 106 (shown in FIG. 2) and the second fin free surface 108 (shown in FIG. 2). In one embodiment, the second fin body 102 includes a second free-bottom angle 116 (shown in FIG. 2), which occurs at the interior of the intersection of the second fin free surface 108 (shown in FIG. 2) and the second fin bottom surface 110 (shown in FIG. 2). In one embodiment, the second fin body 102 includes a second bottom-bed angle 118, which occurs at the interior of the intersection of the second fin bottom surface 110 (shown in FIG. 2) and the second fin bed surface 104 (shown in FIG. 2).

In one embodiment, the second free-bottom angle 116 (shown in FIG. 2) is less than 90 degrees. Because the angle is acute, it causes the second fin free surface 108 (shown in FIG. 2) to slope towards the self-unloading bulk material bed (not labeled). Because the second fin free surface 108 (shown in FIG. 2) slopes towards the self-unloading bulk material bed (shown in FIG. 2), the second fin body 102 is tapered, which allows a piler (not pictured) to closely approach a self-unloading bulk material bed (not labeled) and directs materials towards a receiving target (not shown) during the unloading process.

In one embodiment, the second bed-top angle 112 (shown in FIG. 2) is approximately 90 degrees. In one embodiment, the second bed-top angle 112 (shown in FIG. 2) is greater than 90 degrees. In one embodiment, the second bed-top angle 112 (shown in FIG. 2) is less than 90 degrees.

In one embodiment, the second top-free angle 114 (shown in FIG. 2) is approximately 90 degrees. In one embodiment, the second top-free angle 114 (shown in FIG. 2) is greater than 90 degrees. In one embodiment, the second top-free angle 114 (shown in FIG. 2) is less than 90 degrees.

In one embodiment, the second free-bottom angle 116 (shown in FIG. 2) is approximately 90 degrees. In one embodiment, the second free-bottom angle 116 (shown in FIG. 2) is greater than 90 degrees. In one embodiment, the second free-bottom angle 116 (shown in FIG. 2) is less than 90 degrees.

In one embodiment, the second bottom-bed angle 118 (shown in FIG. 2) is approximately 90 degrees. In one embodiment, the second bottom-bed angle 118 (shown in FIG. 2) is greater than 90 degrees. In one embodiment, the second bottom-bed angle 118 (shown in FIG. 2) is less than 90 degrees.

Figure 1C:
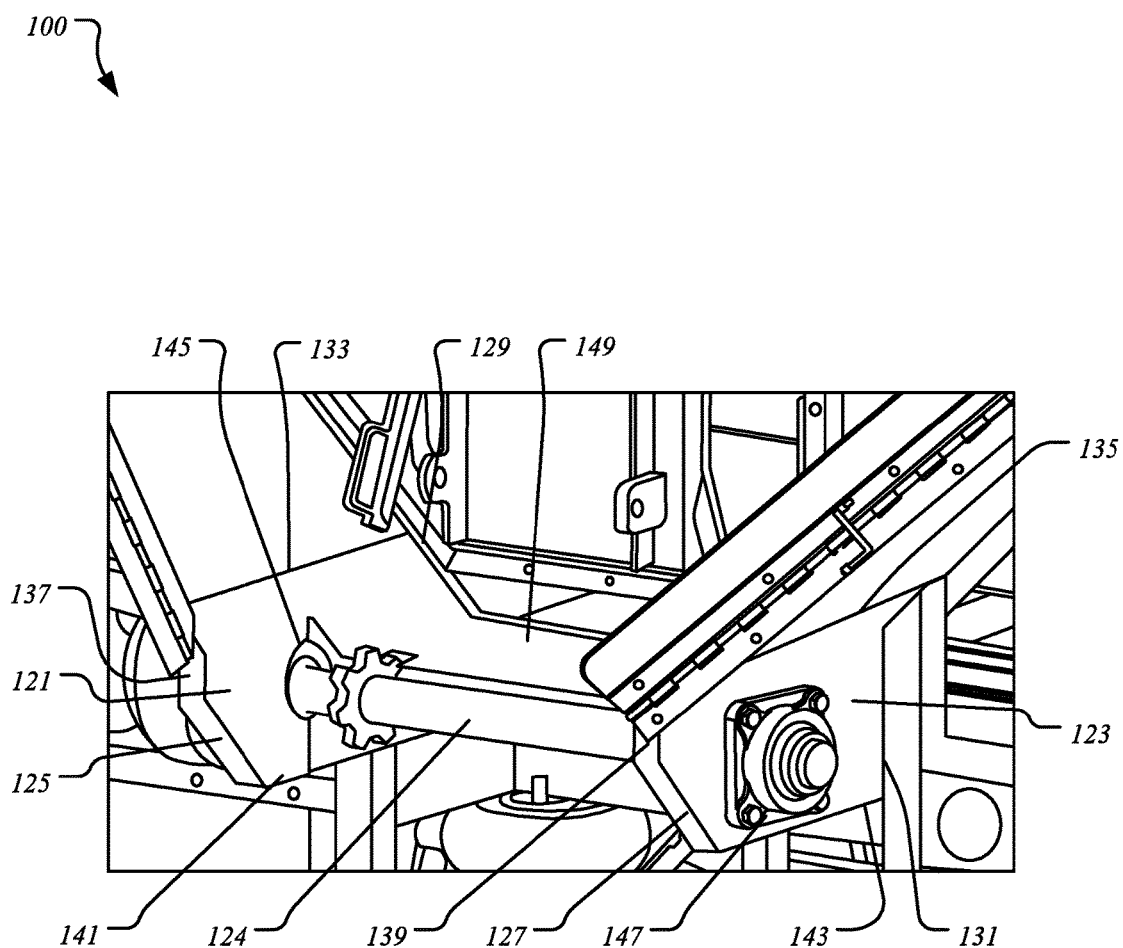
FIG. 1C is a perspective view of a shaft and shaft mount including a first and second sidewall, in accordance with one embodiment.

As seen in FIG. 1C, in one embodiment, discharge apparatus 100 includes a shaft mount system comprised of first sidewall 121, a second sidewall 123, a first shaft mount 145, and a second shaft mount 147. In one embodiment, a shaft 124 is positioned between the first sidewall 121 and the second sidewall 123 and mounted via first shaft mount 145 and second shaft mount 147. In various embodiments, the first shaft mount 145 and the second shaft mount 147 include any shaft mounts as known in the art at the time of filing and/or developed thereafter.

In one embodiment, the first sidewall 121 includes a first sidewall bed surface 129, a first sidewall top surface 133, a first sidewall free surface 137, and a first sidewall bottom surface 141. In one embodiment, the first sidewall 121 includes a first chamfer 125 at a corner where the first sidewall free surface 137 joins with the first sidewall bottom surface 141.

In one embodiment, the first sidewall bottom surface 141 and the second sidewall bottom surface 143 are adjacent to a discharge bottom 149.

In one embodiment, the shaft 124 is mounted at least six inches from the first sidewall free surface 137, towards the first sidewall bed surface 129. In one embodiment, the shaft 124 is mounted at least three inches from the first sidewall free surface 137, towards the first sidewall bed surface 129. In one embodiment, the shaft 124 is mounted flush with the first sidewall free surface 137.

In one embodiment, the second sidewall 123 includes a second sidewall bed surface 131, a second sidewall top surface 135, a second sidewall free surface 139, and a second sidewall bottom surface 143. In one embodiment, the second sidewall 123 includes a second chamfer 127 at a corner where the second sidewall free surface 139 joins with the second sidewall bottom surface 143.

In one embodiment, the shaft 124 is mounted at least six inches from the second sidewall free surface 139, towards the second sidewall bed surface 131. In one embodiment, the shaft 124 is mounted at least three inches from the second sidewall free surface 139, towards the second sidewall bed surface 131. In one embodiment, the shaft 124 is mounted flush with the second sidewall free surface 139.

Turning now to FIG. 2, in one embodiment, second fin body 102 includes second fin bed surface 104, second fin top surface 106, second fin free surface 108, and second fin bottom surface 110.

In various embodiments, the second fin body 102 includes second bed-top angle 112, second top-free angle 114, second free-bottom angle 116, and second bottom-bed angle 118. As discussed above, in one embodiment, the second bed-top angle 112 occurs at the interior of the intersection of the second fin bed surface 104 and the second fin top surface 106. In one embodiment, the second top-free angle 114 occurs at the interior of the intersection of the second fin top surface 106 and the second fin free surface 108. In one embodiment, the second free-bottom angle 116 occurs at the interior of the intersection of the second fin free surface 108 and the second fin bottom surface 110. In one embodiment, the second bottom-bed angle 118 occurs at the interior of the intersection of the second fin bottom surface 110 and the second fin bed surface 104.

In one embodiment, the second bed-top angle 112 is less than 90 degrees. In one embodiment, the second top-free angle 114 is greater than 90 degrees. In one embodiment, the second free-bottom angle 116 is less than 90 degrees. In one embodiment, the second bottom-bed angle 118 is approximately 90 degrees.

In one embodiment, because the second bed-top angle 112 is less than 90 degrees, the second top-free angle 114 is greater than 90 degrees, the second free-bottom angle 116 is less than 90 degrees, and the second bottom-bed angle 118 is approximately 90 degrees, the second fin bed surface 104, second fin top surface 106, second fin free surface 108, and second fin bottom surface 110 are different lengths.

In one embodiment, the second fin bed surface 104 is longer than the second fin free surface 108. In one embodiment, the second fin top surface 106 is shorter than the second fin bottom surface 110.

In one embodiment, a second deflector 120 is attached to the second fin free surface 108 via a second hinge mechanism 157 (not pictured).

In one embodiment, because of angle configurations and surface lengths, the second fin free surface 108 slopes towards the self-unloading bulk material bed (not labeled) and the second fin body 102 is tapered. Because the second fin body 102 is tapered, a piler (not pictured) is able to approach the self-unloading bulk material bed (not labeled) more closely than would otherwise be possible. Additionally, the tapered shape of the second fin body 102 encourages materials to fall towards a receiving target (not pictured) during the unloading process.

In various embodiments, the angles of the second bed-top angle 112, the second top-free angle 114, the second free-bottom angle 116, and the second bottom-bed angle 118 can be any angle desired and/or dictated by intended shape of the second fin body 102.

For example, in one embodiment, the second bed-top angle 112 is greater than ninety degrees, the second top-free angle 114 is less than ninety degrees, the second free-bottom angle 116 is greater than ninety degrees, and the second bottom-bed angle 118 is less than ninety degrees.

In one embodiment, the second bed-top angle 112 is approximately ninety degrees, the second top-free angle 114 is greater than ninety degrees, the second free-bottom angle 116 is less than ninety degrees, and the second bottom-bed angle 118 is approximately ninety degrees.

In one embodiment, the second bed-top angle 112 is greater than ninety degrees, the second top-free angle 114 is greater than ninety degrees, the second free-bottom angle 116 is less than ninety degrees, and the second bottom-bed angle 118 is less than ninety degrees.

In one embodiment, the second bed-top angle 112 is approximately ninety degrees, the second top-free angle 114 is approximately ninety degrees, the second free-bottom angle 116 is approximately ninety degrees, and the second bottom-bed angle 118 is approximately ninety degrees.

In one embodiment, the second bed-top angle 112 is greater than ninety degrees, the second top-free angle 114 is less than ninety degrees, the second free-bottom angle 116 is less than ninety degrees, and the second bottom-bed angle 118 is greater than ninety degrees.

In one embodiment, the second bed-top angle 112 is approximately 90 degrees. In one embodiment, the second bed-top angle 112 is greater than 90 degrees. In one embodiment, the second bed-top angle 112 is less than 90 degrees.

In one embodiment, the second top-free angle 114 is approximately 90 degrees. In one embodiment, the second top-free angle 114 is greater than 90 degrees. In one embodiment, the second top-free angle 114 is less than 90 degrees.

In one embodiment, the second free-bottom angle 116 is approximately 90 degrees. In one embodiment, the second free-bottom angle 116 is greater than 90 degrees. In one embodiment, the second free-bottom angle 116 is less than 90 degrees.

In one embodiment, the second bottom-bed angle 118 is approximately 90 degrees. In one embodiment, the second bottom-bed angle 118 is greater than 90 degrees. In one embodiment, the second bottom-bed angle 118 is less than 90 degrees.

In one embodiment, second sidewall 123 is located below the second fin body 102. In one embodiment, shaft 124 is mounted on the second sidewall 123 and first sidewall 121 (pictured in FIG. 1C).

In one embodiment, the second sidewall top surface 135 is coupled with the second fin bottom surface 110. In one embodiment, the second sidewall 123 is contiguous with the second fin body 102. In one embodiment, the second sidewall 123 and the second fin body 102 are constructed from one sheet of material.

In one embodiment, the second sidewall 123 includes a second sidewall bottom surface 143. In one embodiment, the second sidewall bottom surface 143 is adjacent to a discharge bottom 149. In one embodiment, the second sidewall 123 is coupled to the discharge bottom 149. In one embodiment, the second sidewall 123 is removably coupled to the discharge bottom 149. In one embodiment, the second sidewall 123 and the discharge bottom 149 are contiguous. In one embodiment, the second sidewall 123 and the discharge bottom 149 are constructed from one sheet of material.

In one embodiment, the second sidewall 123, the discharge bottom 149, and the second fin body 102 are constructed from one sheet of material. In one embodiment, the second sidewall 123, the discharge bottom 149, and the second fin body 102 are contiguous.

Figure 3:
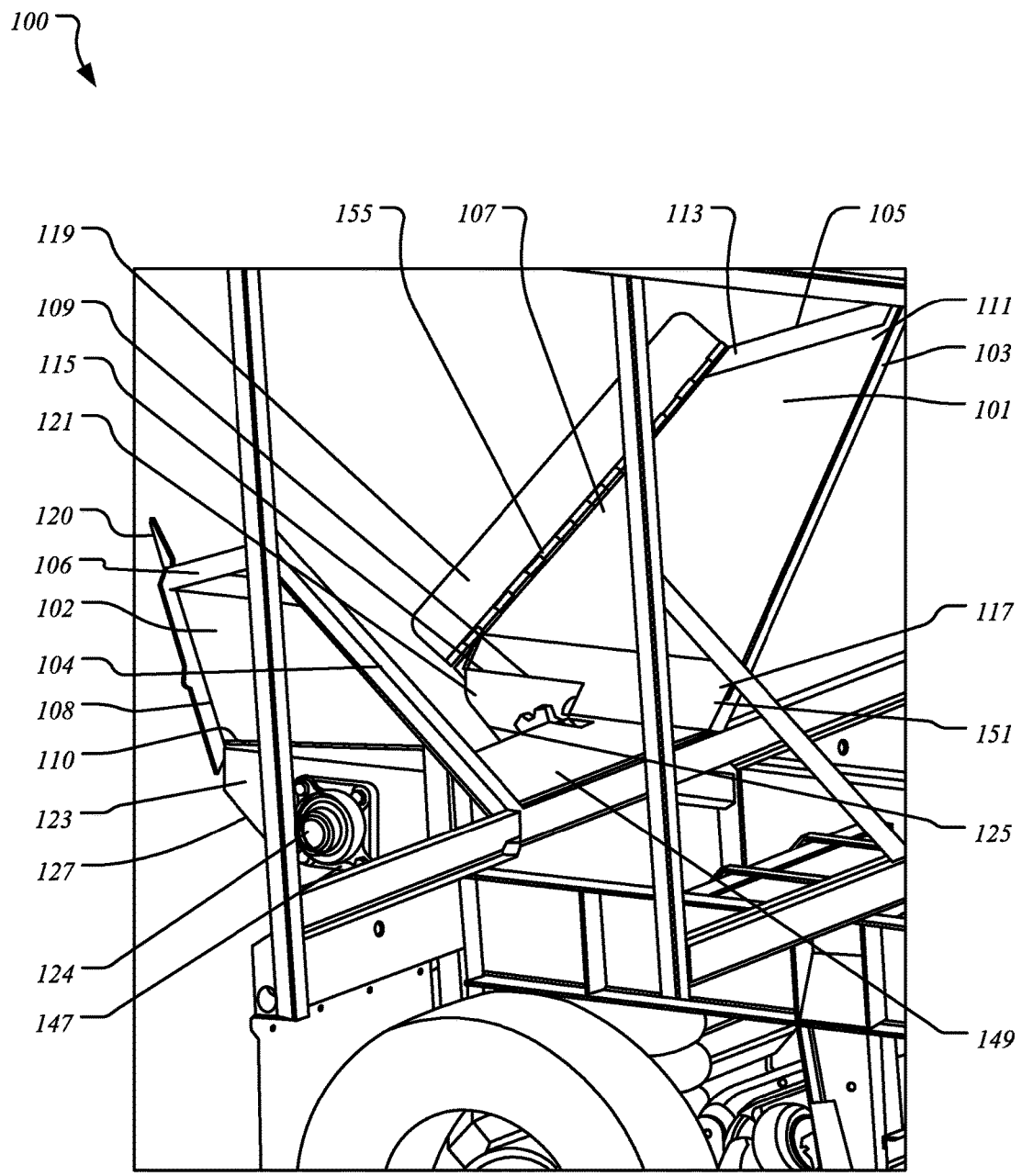
FIG. 3 is an angle view of a discharge apparatus, in accordance with one embodiment.

Turning now to FIG. 3, in one embodiment, first fin body 101 includes first fin bed surface 103, first fin top surface 105, first fin free surface 107, and first fin bottom surface 109.

In one embodiment, first deflector 119 is attached to the first fin free surface 107 via a first hinge mechanism 155.

In various embodiments, the first fin body 101 includes first bed-top angle 111, first top-free angle 113, first free-bottom angle 115, and first bottom-bed angle 117. As discussed above, in one embodiment, the first bed-top angle 111 occurs at the interior of the intersection of the first fin bed surface 103 and the first fin top surface 105. In one embodiment, the first top-free angle 113 occurs at the interior of the intersection of the first fin top surface 105 and the first fin free surface 107. In one embodiment, the first free-bottom angle 115 occurs at the interior of the intersection of the first fin free surface 107 and the first fin bottom surface 109. In one embodiment, the first bottom-bed angle 117 occurs at the interior of the intersection of the first fin bottom surface 109 and the first fin bed surface 103.

In one embodiment, the first bed-top angle 111 is less than 90 degrees. In one embodiment, the first top-free angle 113 is greater than 90 degrees. In one embodiment, the first free-bottom angle 115 is less than 90 degrees. In one embodiment, the first bottom-bed angle 117 is approximately 90 degrees.

In one embodiment, because the first bed-top angle 111 is less than 90 degrees, the first top-free angle 113 is greater than 90 degrees, the first free-bottom angle 115 is less than 90 degrees, and the first bottom-bed angle 117 is approximately 90 degrees, the first fin bed surface 103, the first fin top surface 105, the first fin free surface 107, and the first fin bottom surface 109 are different lengths.

In one embodiment, the first fin bed surface 103 is longer than the first fin free surface 107. In one embodiment, the first fin top surface 105 is shorter than the first fin bottom surface 109.

In one embodiment, because of angle configurations and surface lengths, the first fin free surface 107 slopes towards the self-unloading bulk material bed and the first fin body 101 is tapered. Because the first fin is tapered, a piler is able to approach the self-unloading bulk material bed more closely than would otherwise be possible. Additionally, the tapered shape of the first fin body 101 encourages materials to fall towards a receiving target during the unloading process.

In various embodiments, the angles of the first bed-top angle 111, the first top-free angle 113, the first free-bottom angle 115, and the first bottom-bed angle 117 can be any angle desired and/or dictated by the intended shape of the first fin body 101.

For example, in one embodiment, the first bed-top angle 111 is greater than ninety degrees, the first top-free angle 113 is less than ninety degrees, the first free-bottom angle 115 is greater than ninety degrees, and the first bottom-bed angle 117 is less than ninety degrees.

In one embodiment, the first bed-top angle 111 is approximately ninety degrees, the first top-free angle 113 is greater than ninety degrees, the first free-bottom angle 115 is less than ninety degrees, and the first bottom-bed angle 117 is approximately ninety degrees.

In one embodiment, the first bed-top angle 111 is greater than ninety degrees, the first top-free angle 113 is greater than ninety degrees, the first free-bottom angle 115 is less than ninety degrees, and the first bottom-bed angle 117 is less than ninety degrees.

In one embodiment, the first bed-top angle 111 is approximately ninety degrees, the first top-free angle 113 is approximately ninety degrees, the first free-bottom angle 115 is approximately ninety degrees, and the first bottom-bed angle 117 is approximately ninety degrees.

In one embodiment, the first bed-top angle 111 is greater than ninety degrees, the first top-free angle 113 is less than ninety degrees, the first free-bottom angle 115 is less than ninety degrees, and the first bottom-bed angle 117 is greater than ninety degrees.

In one embodiment, the first bed-top angle 111 is approximately 90 degrees. In one embodiment, the first bed-top angle 111 is greater than 90 degrees. In one embodiment, the first bed-top angle 111 is less than 90 degrees.

In one embodiment, the first top-free angle 113 is approximately 90 degrees. In one embodiment, the first top-free angle 113 is greater than 90 degrees. In one embodiment, the first top-free angle 113 is less than 90 degrees.

In one embodiment, the first free-bottom angle 115 is approximately 90 degrees. In one embodiment, the first free-bottom angle 115 is greater than 90 degrees. In one embodiment, the first free-bottom angle 115 is less than 90 degrees.

In one embodiment, the first bottom-bed angle 117 is approximately 90 degrees. In one embodiment, the first bottom-bed angle 117 is greater than 90 degrees. In one embodiment, the first bottom-bed angle 117 is less than 90 degrees.

In one embodiment, the first sidewall 121 is located below the first fin body 101. In one embodiment, the first sidewall 121 includes first chamfer 125. In one embodiment, the shaft 124 is mounted on the first sidewall 121 and the second sidewall 123 via a first shaft mount 145 (pictured in FIG. 6) and a second shaft mount 147.

In one embodiment, a first bottom-fin coupling mechanism 151 couples the first fin body 101 to the discharge bottom 149. In one embodiment, the first bottom-fin coupling mechanism 151 removably couples the first fin body 101 to the discharge bottom 149. In one embodiment, the first bottom-fin coupling mechanism 151, the first fin body 101, and the discharge bottom 149 are contiguous. In one embodiment, the first bottom-fin coupling mechanism 151, the first fin body 101, and the discharge bottom 149 are constructed from one piece of material.

In one embodiment, the first bottom-fin coupling mechanism 151 couples the first sidewall 121 and the first fin body 101 to the discharge bottom 149. In one embodiment, the first bottom-fin coupling mechanism 151 removably couples the first sidewall 121 and the first fin body 101 to the discharge bottom 149. In one embodiment, the first bottom-fin coupling mechanism 151, the first fin body 101, the first sidewall 121, and the discharge bottom 149 are contiguous. In one embodiment, the first bottom-fin coupling mechanism 151, the first fin body 101, the first sidewall 121, and the discharge bottom 149 are constructed from one piece of material.

In one embodiment, the second fin body 102 includes second fin bed surface 104, second fin top surface 106, second fin free surface 108, and second fin bottom surface 110.

Figure 4:
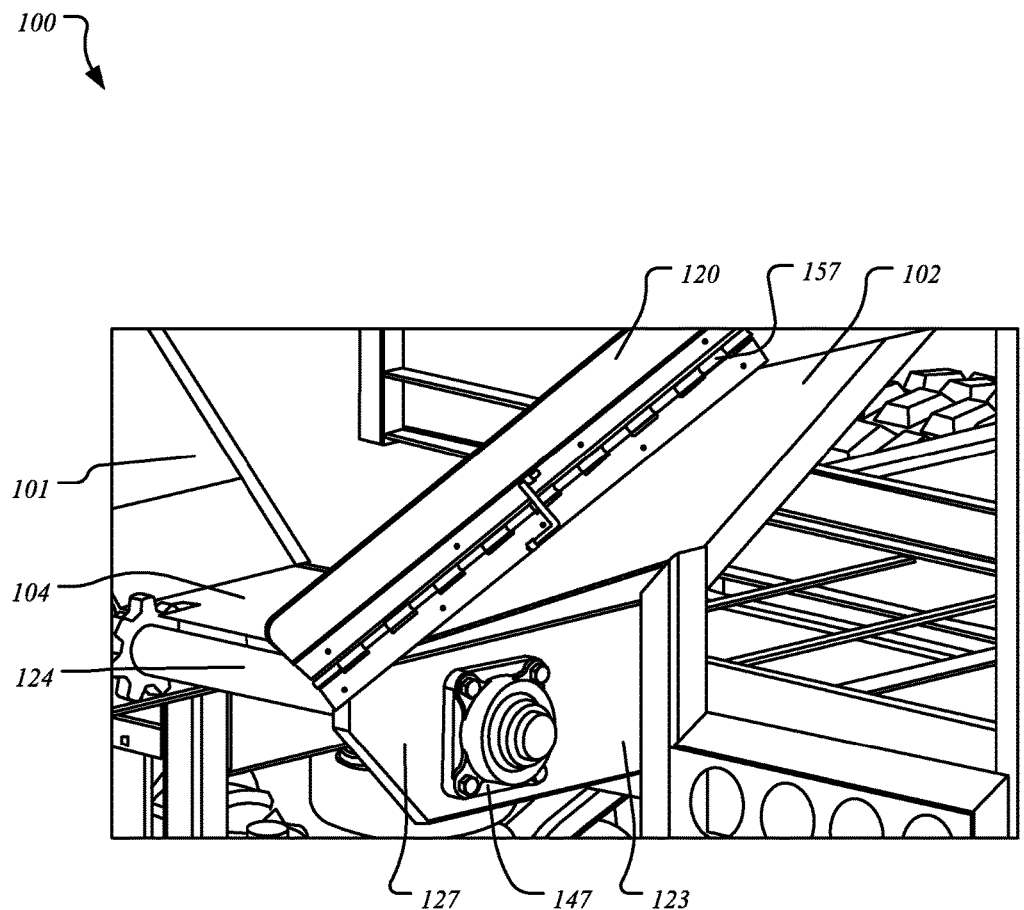
FIG. 4 is an angle view of a second fin body, second sidewall, and second deflector, in accordance with one embodiment.

In one embodiment, the second deflector 120 is attached to the second fin free surface 108 via a second hinge mechanism 157 (pictured in FIG. 4).

In one embodiment, the second sidewall 123 is located below the second fin body 102. In one embodiment, the second sidewall 123 includes second chamfer 127. In one embodiment, a second bottom-fin coupling mechanism 153 (pictured in FIG. 5) couples the second fin body 102 to the discharge bottom 149. In one embodiment, the second bottom-fin coupling mechanism 153 (pictured in FIG. 5) removably couples the second fin body 102 to the discharge bottom 149. In one embodiment, the second bottom-fin coupling mechanism 153 (pictured in FIG. 5), the second fin body 102, and the discharge bottom 149 are contiguous. In one embodiment, the second bottom-fin coupling mechanism 153 (pictured in FIG. 5), the second fin body 102, and the discharge bottom 149 are constructed from one piece of material.

In one embodiment, the second bottom-fin coupling mechanism 153 (pictured in FIG. 5) couples the second sidewall 123 and the second fin body 102 to the discharge bottom 149. In one embodiment, the second bottom-fin coupling mechanism 153 (pictured in FIG. 5) removably couples the second sidewall 123 and the second fin body 102 to the discharge bottom 149. In one embodiment, the second bottom-fin coupling mechanism 153 (pictured in FIG. 5), the second fin body 102, the second sidewall 123, and the discharge bottom 149 are contiguous. In one embodiment, the second bottom-fin coupling mechanism 153 (pictured in FIG. 5), the second fin body 102, the second sidewall 123, and the discharge bottom 149 are constructed from one piece of material.

In one embodiment, the first bottom-fin coupling mechanism 151, the second bottom-fin coupling mechanism 153 (pictured in FIG. 5), the first fin body 101, the second fin body 102, the first sidewall 121, the second sidewall 123, and the discharge bottom 149 are contiguous. In one embodiment, the first bottom-fin coupling mechanism 151, the second bottom-fin coupling mechanism 153 (pictured in FIG. 5), the first fin body 101, the second fin body 102, the first sidewall 121, the second sidewall 123, and the discharge bottom 149 are constructed from one piece of material.

Moving to FIG. 4, in one embodiment, the discharge apparatus 100 includes the first fin body 101 adjacent to the discharge bottom 149. The second fin body 102 is adjacent to the discharge bottom 149, according to one embodiment. In one embodiment, the shaft 124 is mounted between the first sidewall 121 (pictured in FIG. 1C) and the second sidewall 123. In one embodiment, the shaft is mounted with the first shaft mount 145 (pictured in FIG. 6) and the second shaft mount 147. In one embodiment, the second sidewall 123 includes second chamfer 127.

In one embodiment, the second deflector 120 is coupled with the second fin body 102 via the hinge mechanism 157.

Figure 5:
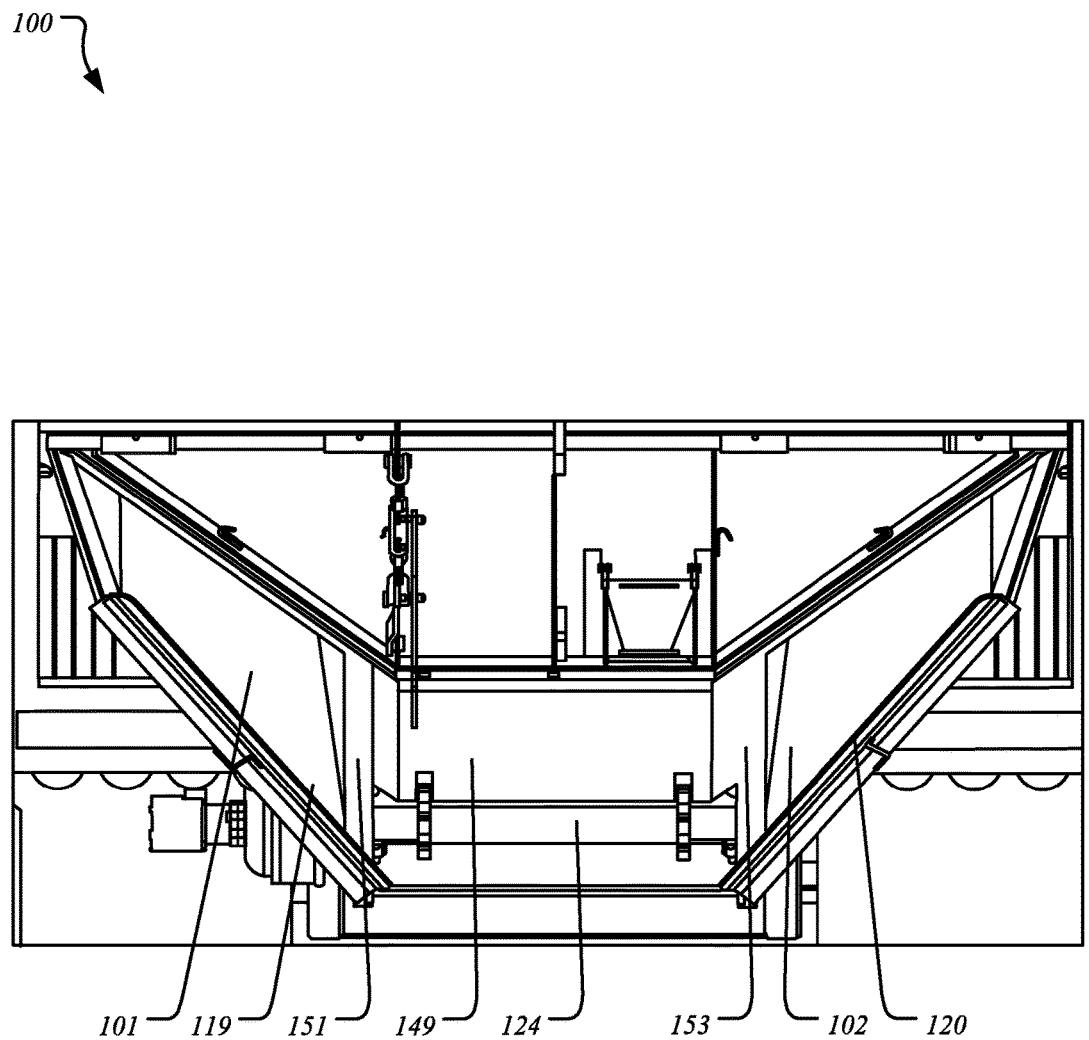
FIG. 5 is an overhead view of a discharge apparatus, including a first fin body, a second fin body, and a discharge bottom, in accordance with one embodiment.

Moving now to FIG. 5, in one embodiment, the discharge apparatus 100 includes the first fin body 101 and the second fin body 102. In one embodiment, the first fin body 101 is coupled to the discharge bottom 149 via the first bottom-fin coupling mechanism 151.

In one embodiment, the first deflector 119 is adjacent to the first fin body 101.

In one embodiment, the second fin body 102 is coupled to the discharge bottom 149 via the second bottom-fin coupling mechanism 153.

In one embodiment, the second deflector 120 is adjacent to the second fin body 102.

In one embodiment, the shaft 124 is positioned underneath the first fin body 101 and the second fin body 102.

Figure 6:
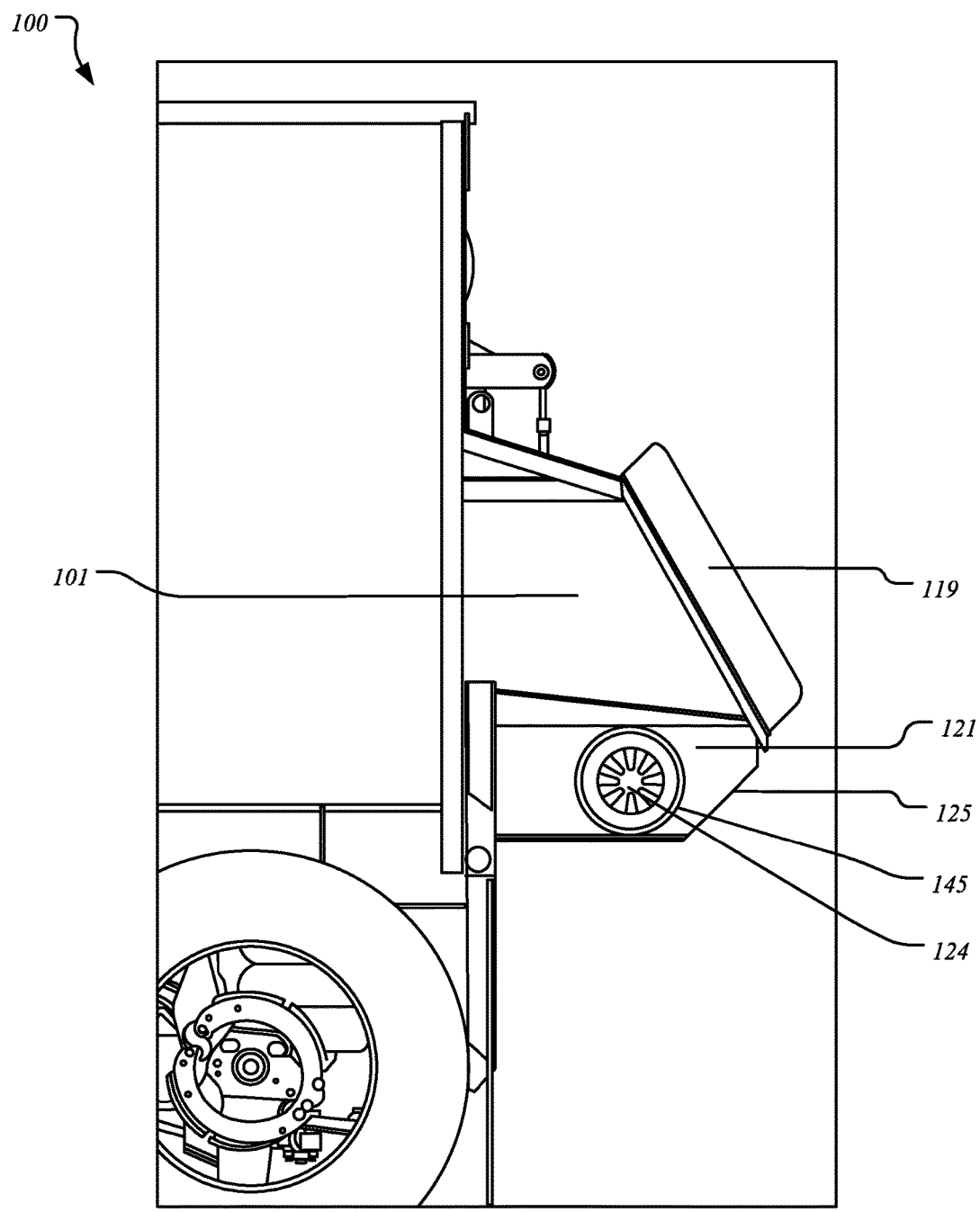
FIG. 6 is a side view of a first fin body, a first sidewall, and a first deflector, in accordance with one embodiment.

Turning to FIG. 6, in one embodiment, the first fin body 101 is adjacent to first deflector 119.

In one embodiment, the first fin body 101 is located above the first sidewall 121. In one embodiment, the first sidewall 121 includes the first chamfer 125. In one embodiment, the first shaft mount 145 mounts the shaft 124 onto the first sidewall 121.

Figure 7:
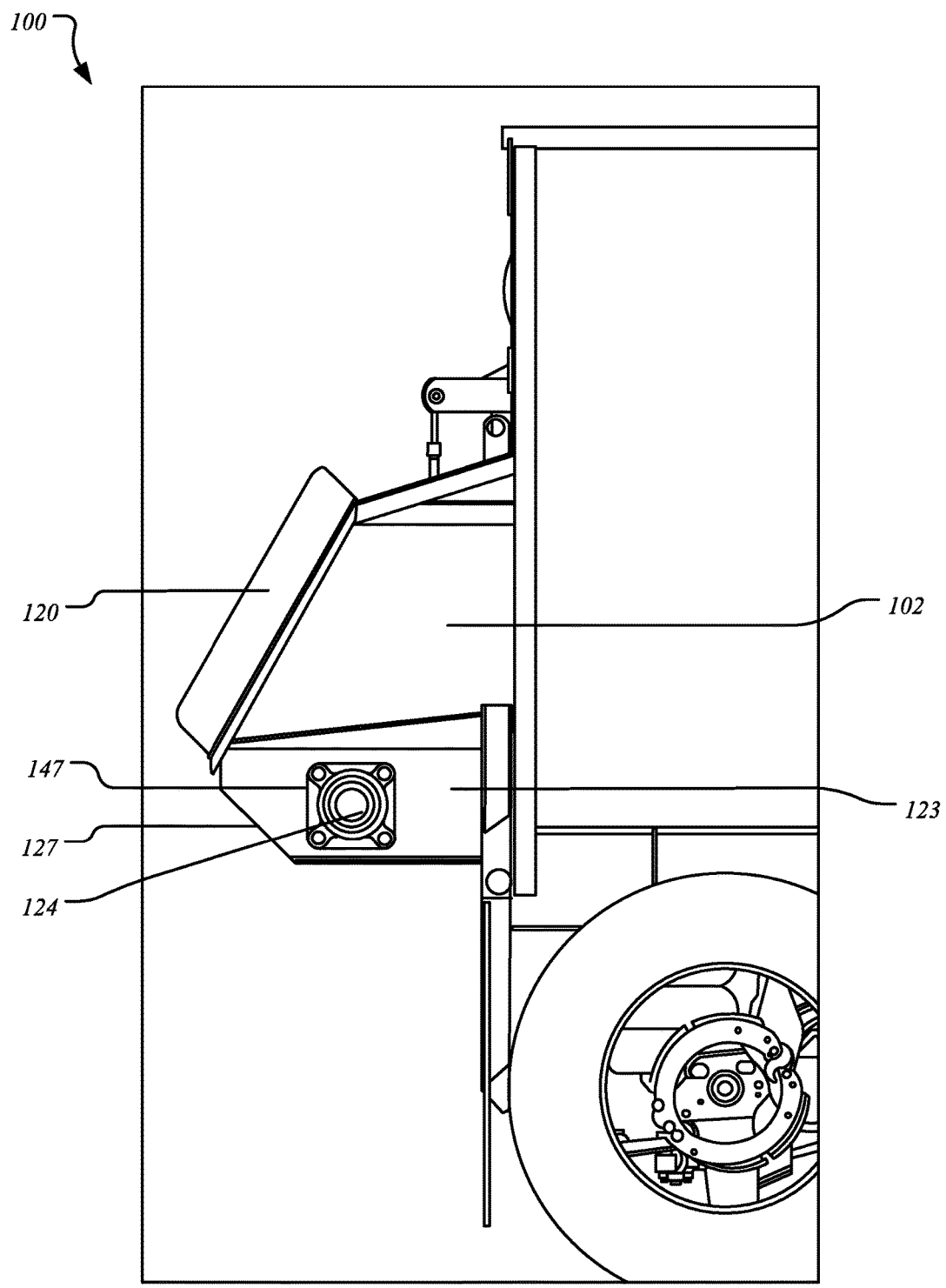
FIG. 7 is a side view of a second fin body, a second sidewall, and a second deflector, in accordance with one embodiment.

Turning to FIG. 7, in one embodiment, the second fin body 102 is adjacent to second deflector 120.

In one embodiment, the second fin body 102 is located above the second sidewall 123. In one embodiment, the second sidewall 123 includes the second chamfer 127. In one embodiment, the second shaft mount 147 mounts the shaft 124 onto the second sidewall 123.

Figure 8:
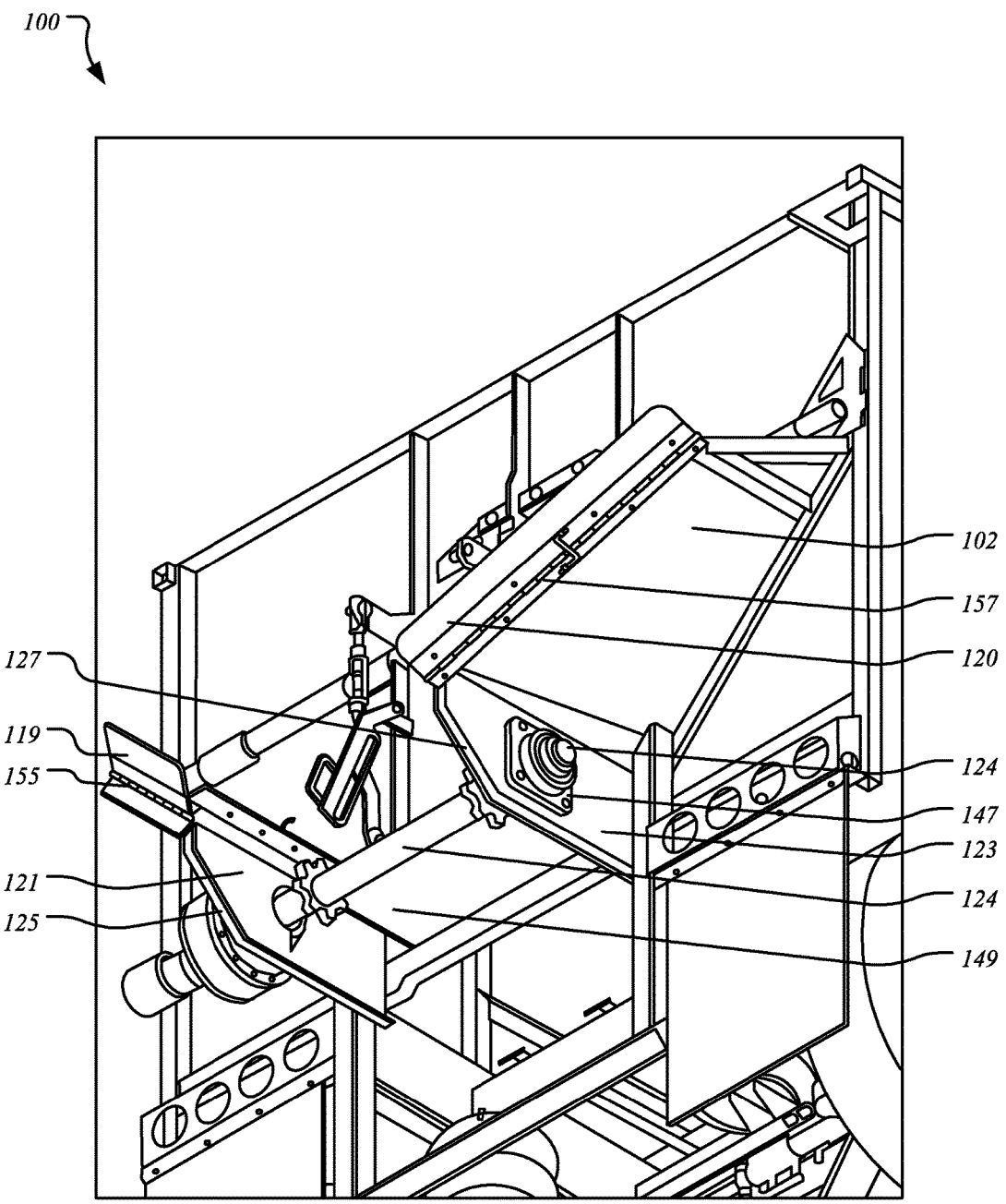
FIG. 8 is a view underneath a first sidewall, a first deflector, a second sidewall, a second fin body, and a second deflector, in accordance with one embodiment.

Moving to FIG. 8, in one embodiment, the first deflector 119 is adjacent to the first fin body 101 (pictured in FIG. 1A). In one embodiment, the first deflector 119 is attached to the first fin body 101 (pictured in FIG. 1A) via the first hinge mechanism 155.

In one embodiment, the first fin body 101 (pictured in FIG. 1A) is adjacent to the first sidewall 123. In one embodiment, the first sidewall 123 includes the first chamfer 125.

In one embodiment, the shaft 124 is mounted via the first sidewall 121 and the second sidewall 123. In one embodiment, the shaft 124 is mounted via the first shaft mount 145 (pictured in FIG. 6) and the second shaft mount 147.

In one embodiment, the second sidewall 123 includes the second chamfer 127.

In one embodiment, the second sidewall 123 is adjacent to the second fin body 102.

In one embodiment, the second deflector 120 is adjacent to the second fin body 102. In one embodiment, the second deflector 120 is attached to the second fin body 102 via the second hinge mechanism 157.

In one embodiment, the discharge bottom 149 is adjacent to the first fin body 101 (pictured in FIG. 1A) and the second fin body 102.

The embodiments described above provide multiple benefits including allowing a piler to approach a self-unloading bulk material bed more closely than otherwise possible, because, in one embodiment, the free surfaces of the fins are tapered towards the self-unloading bulk material bed rather than perpendicular to the ground. This shape allows the piler to get close to the self-unloading bulk material bed without actually making contact with the self-unloading bulk material bed and potentially damaging either the piler or the self-unloading bulk material bed.

The apparatus for discharging materials from the self-unloading bulk material bed also effectively directs materials toward a receiving target during the unloading process. The apparatus for discharging materials from the self-unloading bulk material bed effectively directs materials, in various embodiments, through the shape of the fins, deflectors coupled to the fins, and/or recessing the shaft towards the bed surface of the shaft mount sidewalls. The tapered shape of the fins, in various embodiments, encourages materials to fall towards the receiving target rather than build up at the top of the fins and fall to the ground.

Various embodiments include deflectors coupled to the free surfaces of the fins. These deflectors create a barrier to prevent materials from falling off the free surfaces of the fins and instead, direct materials towards the receiving target.

Additionally, in one embodiment, a conveyor moves along the bottom of the self-unloading bulk material bed and rotates around a shaft coupled to a shaft mount system. In one embodiment, the shaft is located so that at least six inches of space exists between the free surfaces of the shaft mount sidewalls and the shaft. Thus, when materials begin to fall off the conveyor as it rotates around the shaft, the at least six inches of space between the free surfaces of the shaft mount sidewalls and the shaft direct the materials downwards toward the receiving target. As a result of this guidance, the materials unload more quickly and in a manner that minimizes damage to the materials and to equipment.

Finally, the discharge apparatus limits damage to materials by preventing them from being harmed by the sidewalls of the shaft mount during the unloading process. In one embodiment, the corners at the intersection of the free surfaces and the bottom surfaces of the shaft mount sidewalls include chamfers, which provide extra clearance for materials being unloaded onto a receiving target. Currently, materials often make contact with or are trapped between the shaft mounts and the receiving target, resulting in damaged and potentially ruined materials.

It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be re-grouped as portions of one or more other of the process steps and/or operations discussed herein. Consequently, the particular order and/or grouping of the process steps and/or operations discussed herein do not limit the scope of the invention as claimed below.

In addition, the operations shown in the figures are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. An apparatus for discharging materials from a self-unloading bulk material bed comprising:
   a first fin including a first fin body,
   the first fin body having at least five surfaces, including a first primary body surface, a first secondary body surface, a first fin free surface, a first fin bottom surface, and a first fin bed surface, and
   the first fin body having at least three interior angles, the at least three interior angles including a first free-bottom angle,
   wherein the first free-bottom angle is an acute angle formed at the interior of an intersection of the first fin free surface and the first fin bottom surface; and
   a second fin including a second fin body,
   the second fin body having at least five surfaces, including a second primary body surface, a second secondary body surface, a second fin free surface, a second fin bottom surface, and a second fin bed surface, and
   the second fin body having at least three interior angles, the at least three interior angles including a second free-bottom angle,
   wherein the second free-bottom angle is an acute angle formed at the interior of an intersection of the second fin free surface and the second fin bottom surface.

2. The apparatus for discharging materials from the self-unloading bulk material bed of claim 1, further comprising:
   a shaft mount system,
   the shaft mount system including:
      a first sidewall,
      a second sidewall,
      a first shaft mount, and
      a second shaft mount; and
   a shaft.

3. The apparatus for discharging materials from the self-unloading bulk material bed of claim 2, wherein:
   the first sidewall includes the first shaft mount, a first sidewall bed surface, a first sidewall top surface, a first sidewall free surface, a first sidewall bottom surface, and a first sidewall chamfer at a corner where the first sidewall free surface joins with the first sidewall bottom surface;
   the second sidewall includes the second shaft mount, a second sidewall bed surface, a second sidewall top surface, a second sidewall free surface, a second sidewall bottom surface, and a second sidewall chamfer at a corner where the second sidewall free surface joins with the second sidewall bottom surface; and
   the shaft is positioned between the first sidewall and the second sidewall and mounted via the first shaft mount and the second shaft mount.

4. The apparatus for discharging materials from the self-unloading bulk material bed of claim 2, wherein:
   the first sidewall includes the first shaft mount, a first sidewall bed surface, a first sidewall top surface, a first sidewall free surface, and a first sidewall bottom surface;
   the second sidewall includes the second shaft mount, a second sidewall bed surface, a second sidewall top surface, a second sidewall free surface, and a second sidewall bottom surface; and
   the shaft is recessed from the first sidewall free surface and the second sidewall free surface towards the first sidewall bed surface and the second sidewall bed surface.

5. The apparatus for discharging materials from the self-unloading bulk material bed of claim 1, further comprising:
   a first deflector, the first deflector adjacent to the first fin free surface of the first fin body; and a second deflector, the second deflector adjacent to the second fin free surface of the second fin body.

6. The apparatus for discharging materials from the self-unloading bulk material bed of claim 5, wherein:
the first fin free surface of the first fin body and the first deflector are removably coupled; and
the second fin free surface of the second fin body and the second deflector are removably coupled.

7. The apparatus for discharging materials from the self-unloading bulk material bed of claim 5, wherein:
the first fin body and the first deflector are coupled via a first hinge mechanism; and
the second fin body and the second deflector are coupled via a second hinge mechanism.

8. The apparatus for discharging materials from the self-unloading bulk material bed of claim 2, wherein:
the first fin body and the first sidewall are coupled; and
the second fin body and the second sidewall are coupled.

9. The apparatus for discharging materials from the self-unloading bulk material bed of claim 1, further comprising:
a first fin coupling mechanism for attaching the first fin bed surface adjacent to a first lateral surface of a discharge opening; and
a second fin coupling mechanism for attaching the second fin bed surface adjacent to a second lateral surface of the discharge opening.

10. The apparatus for discharging materials from the self-unloading bulk material bed of claim 4, wherein:
the shaft is mounted at least three inches from the first sidewall free surface and at least three inches from the second sidewall free surface.

11. An apparatus for discharging materials from a self-unloading bulk material bed comprising:
a first fin including a first fin body,
the first fin body having at least five surfaces, including a first primary body surface, a first secondary body surface, a first fin free surface, a first fin bottom surface, and a first fin bed surface, and
the first fin body having at least three interior angles, the at least three interior angles including a first free-bottom angle,
wherein the first free-bottom angle is less than ninety degrees and is formed at the interior of an intersection of the first fin free surface and the first fin bottom surface;
a second fin including a second fin body,
the second fin body having at least five surfaces, including a second primary body surface, a second secondary body surface, a second fin free surface, a second fin bottom surface, and a second fin bed surface, and
the second fin body having at least three interior angles, the at least three interior angles including a second free-bottom angle,
wherein the second free-bottom angle is less than ninety degrees and is formed at the interior of an intersection of the second fin free surface and the second fin bottom surface;
a shaft mount system,
the shaft mount system including:
a first sidewall,
a second sidewall,
a first shaft mount,
a second shaft mount; and
a shaft, wherein:
the first sidewall includes the first shaft mount, a first sidewall bed surface, a first sidewall top surface, a first sidewall free surface, a first sidewall bottom surface, and a first sidewall chamfer at a corner where the first sidewall free surface joins with the first sidewall bottom surface,
the second sidewall includes the second shaft mount, a second sidewall bed surface, a second sidewall top surface, a second sidewall free surface, a second sidewall bottom surface, and a second sidewall chamfer at a corner where the second sidewall free surface joins with the second sidewall bottom surface, and
the shaft is positioned between the first sidewall and the second sidewall and mounted via the first shaft mount and the second shaft mount, the first shaft mount and the second shaft mount recessed towards the first sidewall bed surface and the second sidewall bed surface.

12. The apparatus for discharging materials from the self-unloading bulk material bed of claim 11, further comprising:
a first deflector, the first deflector adjacent to the first fin free surface of the first fin body; and
a second deflector, the second deflector adjacent to the second fin free surface of the second fin body.

13. The apparatus for discharging materials from the self-unloading bulk material bed of claim 12, wherein:
the first fin free surface of the first fin body and the first deflector are removably coupled; and
the second fin free surface of the second fin body and the second deflector are removably coupled.

14. The apparatus for discharging materials from the self-unloading bulk material bed of claim 12, wherein:
the first fin body and the first deflector are coupled via a first hinge mechanism; and
the second fin body and the second deflector are coupled via a second hinge mechanism.

15. The apparatus for discharging materials from the self-unloading bulk material bed of claim 11, wherein:
the first fin body and the first sidewall are coupled; and
the second fin body and the second sidewall are coupled.

16. The apparatus for discharging materials from the self-unloading bulk material bed of claim 11, further comprising:
a first fin coupling mechanism for attaching the first fin bed surface adjacent to a first lateral surface of a discharge opening; and
a second fin coupling mechanism for attaching the second fin bed surface adjacent to a second lateral surface of the discharge opening.

17. The apparatus for discharging materials from the self-unloading bulk material bed of claim 11, further comprising:
a first fin coupling mechanism for removably attaching the first fin bed surface adjacent to a first lateral surface of a discharge opening; and
a second fin coupling mechanism for removably attaching the second fin bed surface adjacent to a second lateral surface of the discharge opening.

18. The apparatus for discharging materials of claim 11, wherein:
the shaft is mounted at least three inches from the first sidewall free surface and at least three inches from the second sidewall free surface.

19. The apparatus for discharging materials of claim 11, further comprising:
a discharge bottom.

20. The apparatus for discharging materials of claim 19, wherein:
the discharge bottom, the first fin body, and the second fin body comprise a contiguous piece.

21. An apparatus for discharging materials from a self-unloading bulk material bed comprising:
a first fin including a first fin body,
the first fin body having at least five surfaces, including a first primary body surface, a first secondary body surface, a first fin free surface, a first fin bottom surface, and a first fin bed surface, and
the first fin body having at least three interior angles, the at least three interior angles including a first free-bottom angle,
wherein the first free-bottom angle is less than ninety degrees and is formed at the interior of an intersection of the first fin free surface and the first fin bottom surface;
a second fin including a second fin body,
the second fin body having at least five surfaces, including a second primary body surface, a second secondary body surface, a second fin free surface, a second fin bottom surface, and a second fin bed surface, and
the second fin body having at least three interior angles, the at least three interior angles including a second free-bottom angle,
wherein the second free-bottom angle is less than ninety degrees and is formed at the interior of an intersection of the second fin free surface and the second fin bottom surface;
a shaft mount system,
the shaft mount system including:
a first sidewall,
a second sidewall,
a first shaft mount, and
a second shaft mount;
a shaft, wherein:
the first sidewall includes the first shaft mount, a first sidewall bed surface, a first sidewall top surface, a first sidewall free surface, a first sidewall bottom surface, and a first sidewall chamfer at a corner where the first sidewall free surface joins with the first sidewall bottom surface,
the second sidewall includes the second shaft mount, a second sidewall bed surface, a second sidewall top surface, a second sidewall free surface, a second sidewall bottom surface, and a second sidewall chamfer at a corner where the second sidewall free surface joins with the second sidewall bottom surface, and
the shaft is positioned between the first sidewall and the second sidewall and mounted via the first shaft mount and the second shaft mount, the first shaft mount and the second shaft mount recessed towards the first sidewall bed surface and the second sidewall bed surface;
a first deflector, the first deflector adjacent to the first fin free surface of the first fin body; and
a second deflector, the second deflector adjacent to the second fin free surface of the second fin body.

22. The apparatus for discharging materials from the self-unloading bulk material bed of claim 21, further comprising:
a first coupling mechanism for attaching the first fin bottom surface of the first fin body to the first sidewall top surface; and
a second coupling mechanism for attaching the second fin bottom surface of the second fin body to the second sidewall top surface.

23. The apparatus for discharging materials from the self-unloading bulk material bed of claim 21, wherein:
the first fin free surface of the first fin body and the first deflector are removably coupled; and
the second fin free surface of the second fin body and the second deflector are removably coupled.

24. The apparatus for discharging materials from the self-unloading bulk material bed of claim 21, wherein:
the first fin body and the first deflector are coupled via a first hinge mechanism; and
the second fin body and the second deflector are coupled via a second hinge mechanism.

25. The apparatus for discharging materials from the self-unloading bulk material bed of claim 21, wherein:
the first fin body and the first sidewall are coupled; and
the second fin body and the second sidewall are coupled.

26. The apparatus for discharging materials from the self-unloading bulk material bed of claim 21, further comprising:
a first fin coupling mechanism for attaching the first fin bed surface adjacent to a first lateral surface of a discharge opening; and
a second fin coupling mechanism for attaching the second fin bed surface adjacent to a second lateral surface of the discharge opening.

27. The apparatus for discharging materials from the self-unloading bulk material bed of claim 21, further comprising:
a first fin coupling mechanism for removably attaching the first fin bed surface adjacent to a first lateral surface of a discharge opening; and
a second fin coupling mechanism for removably attaching the second fin bed surface adjacent to a second lateral surface of the discharge opening.

28. The apparatus for discharging materials from the self-unloading bulk material bed of claim 21, wherein:
the shaft is mounted at least three inches from the first sidewall free surface and at least three inches from the second sidewall free surface.

29. The apparatus for discharging materials from the self-unloading bulk material bed of claim 21, further comprising:
a discharge bottom.

30. The apparatus for discharging materials from the self-unloading bulk material bed of claim 29, wherein:
the discharge bottom, the first fin body, and the second fin body comprise a contiguous piece.

* * * * *